Oct. 25, 1966 L. C. J. ROSCOE 3,281,790

MULTIFREQUENCY SIGNALING RECEIVER CIRCUIT

Filed April 1, 1963 4 Sheets-Sheet 1

INVENTOR
L. C. J. ROSCOE
BY E J Olinder
ATTORNEY

Oct. 25, 1966 L. C. J. ROSCOE 3,281,790

MULTIFREQUENCY SIGNALING RECEIVER CIRCUIT

Filed April 1, 1963 4 Sheets-Sheet 2

SIGNAL TIMER WAVEFORMS
SHORT SIGNALS $t_1$ CHANNEL CCT. OPERATE TIME ≈ 13 ms $t_2$ SIGNAL TIMER PERIOD ≈ 21.5 ms $t_3$ OUTPUT TIMER PERIOD ≈ 45 ms (DIGITAL OUTPUTS DURING $t_3$)

$t_R$ CHANNEL CCT. RELEASE TIME

Oct. 25, 1966 L. C. J. ROSCOE 3,281,790

MULTIFREQUENCY SIGNALING RECEIVER CIRCUIT

Filed April 1, 1963 4 Sheets-Sheet 4

SIGNAL TIMER WAVEFORMS $t_1$ CHANNEL CCT. OPERATE TIME ≈ 13 ms $t_2$ SIGNAL TIMER PERIOD ≈ 21.5 ms $t_3$ OUTPUT TIMER PERIOD ≈ 45 ms $t_4$ TIME DELAY FOR ACTIVATION OF SLOW RELEASE ≈ 5 ms $t_5$ PERIOD OF TIME DELAY DURING WHICH SLOW RELEASE IS ACTIVE ≈ SIG. DURATION + 20 ms $t_6$ SLOW RELEASE TIME ≈ 20 ms

United States Patent Office 3,281,790
Patented Oct. 25, 1966

3,281,790
MULTIFREQUENCY SIGNALING RECEIVER CIRCUIT

Lawrence C. J. Roscoe, North Brunswick, N.J., assignor to Bell Telephone Laboratories, Incorporated, New York, N.Y., a corporation of New York Filed Apr. 1, 1963, Ser. No. 269,587
14 Claims. (Cl. 340—171)

This invention relates to multifrequency signaling systems and more particularly to multifrequency signal receivers and its general object is to increase the reliability of such equipment.

A multifrequency signal receiver typical of the type designed for use in a telephone plant is shown in an application Ser. No. 50,916, filed by F. T. Boesch, D. H. Nash and L. Schenker, Aug. 22, 1960, now U.S. Patent No. 3,128,349. Such a receiver is designed to convert coincident two-tone bursts, which may be generated by pushbutton dialing for example, into D.C. signals which are then used conventionally to initiate the operation of electromechanical central office switching equipment. In prior art receivers such as that shown by Boesch et al. for example, various circuit combinations are employed to test the validity of incoming combinations of coincident two-tone bursts in order to ensure that direct current output signals are generated only in response to valid input signals. A timer circuit is employed for example, to check for the presence of coincidence between two valid tone signals as indicated by the operation of both a high frequency group and a low frequency group receiver detector. An initial valid signal check initiates a second timer action, that of providing a timing-out period of some preselected duration in order to ensure the presence of a valid signal for at least the preselected timing interval before activating receiver outputs. This timing action is immediately reset should the signal check fail. When the time-out is completed, a steering circuit is activated and an output timer is started. The output timer provides for a preselected output timing period during which the detectors are locked in their operating state and the receiver output circuits are activated.

After a valid signal has been checked and timed and the outputs activated by the output timer, the detectors are no longer locked up, but are under the control of the input tones. It has been found that in certain system environments in which multifrequency receivers are employed, impulse noises occur which result in the break-up of long duration input tones. Such break-ups are translated into corresponding interruptions in the generation of output signals. The result, in effect, is a double registration of the signal for a single incoming digit and consequently the calling party is provided with an erroneous connection. More specifically, if a pair of long-duration signal input tones is broken up by a noise burst as described, the operated detectors are released by virtue of the failure of the prescribed validity check. When the noise burst ends, and the detectors are reoperated by the continuance of the valid input tones, the validity check is again satisfied and hence the signal timer and the output timer are recycled. It is this action which results in the generation of a second set of receiver outputs in response to an input signal pair which represents only a single digit, an occurrence conventionally termed double-digit registration.

Accordingly, a specific object of the invention is to avoid actuating a multifrequency receiver by spurious input signals.

An additional object of the invention is to prevent the double registration of digits in the output of a multifrequency receiver which double registration is caused by the introduction of relatively short bursts of noise during relatively long-duration input tones.

A further object of the invention is to subject incoming signals in a multifrequency signal receiver to a combination of validity tests without resort to complex circuitry.

These and other objects are achieved in accordance with the principles of the invention by providing a means for preventing the signal timer from being reset and hence recycled by short-duration break-ups. The principles of the invention stem in part from the realization that most break-ups in the output are the result of noise pulses of relatively short duration which cause the detectors to release for a period of time less than some preselected period, which may be on the order of 20 milliseconds for example. Accordingly, a key aspect of the invention involves locking-up the signal timer, which is directly controlled by the detector outputs, for a period of time somewhat in excess of the period indicated after the detectors are released. It has been found, however, that the introduction of a delay in signal timer release immediately after the completion of the output timer interval has an adverse effect on receiver cycle time and increases the circuit complexity required for the maintenance of uniform receiver cycle speed. Also of importance in this connection is the fact that during the output timer interval, the detectors are immune to noise at the input of the receiver. In accordance with the invention, therefore, the lock-up circuit is energized only at some preselected instant of time occurring somewhat after the completion of the output timer interval and as a result normal fast pulse receiver operation remains unaffected.

In accordance with a further aspect of the invention, protection is provided against possible errors resulting from partial resetting of the signal timer by input signal echoes which last to the exact end of the output timing interval. In the case of such echoes, the lock-up circuit will not yet have been activated and hence it is possible for the signal timer to be reset. Echoes generally result in extremely short break-ups of the digit outputs, however, and if, as in the prior art, a signal timer having a relatively long reset time is employed, the timer may be only partially reset thus causing the receiver to recycle. To avoid this difficulty a receiver in accordance with the invention uniquely employs a special purpose regenerative circuit to ensure extremely rapid timer reset.

Accordingly, one feature of the invention is the employment of a lock-up circuit in a multifrequency receiver which prevents the signal timer from being reset and recycled by short-duration signal break-ups.

Another feature of the invention is an arrangement which precludes the signal timer lock-up circuit from being energized until a point in time occurring at the termination of a preselected period after the completion of the output timer interval.

A further feature of the invention is the employment of a regenerative circuit to ensure extremely rapid reset of the signal timer thus avoiding the possibility of partial reset and recycling which may result from the presence of signal echoes.

These and other objects and features will be fully apprehended from a consideration of the following detailed description of an illustrative embodiment of the invention and from the accompanying drawing in which.

Figure 1:
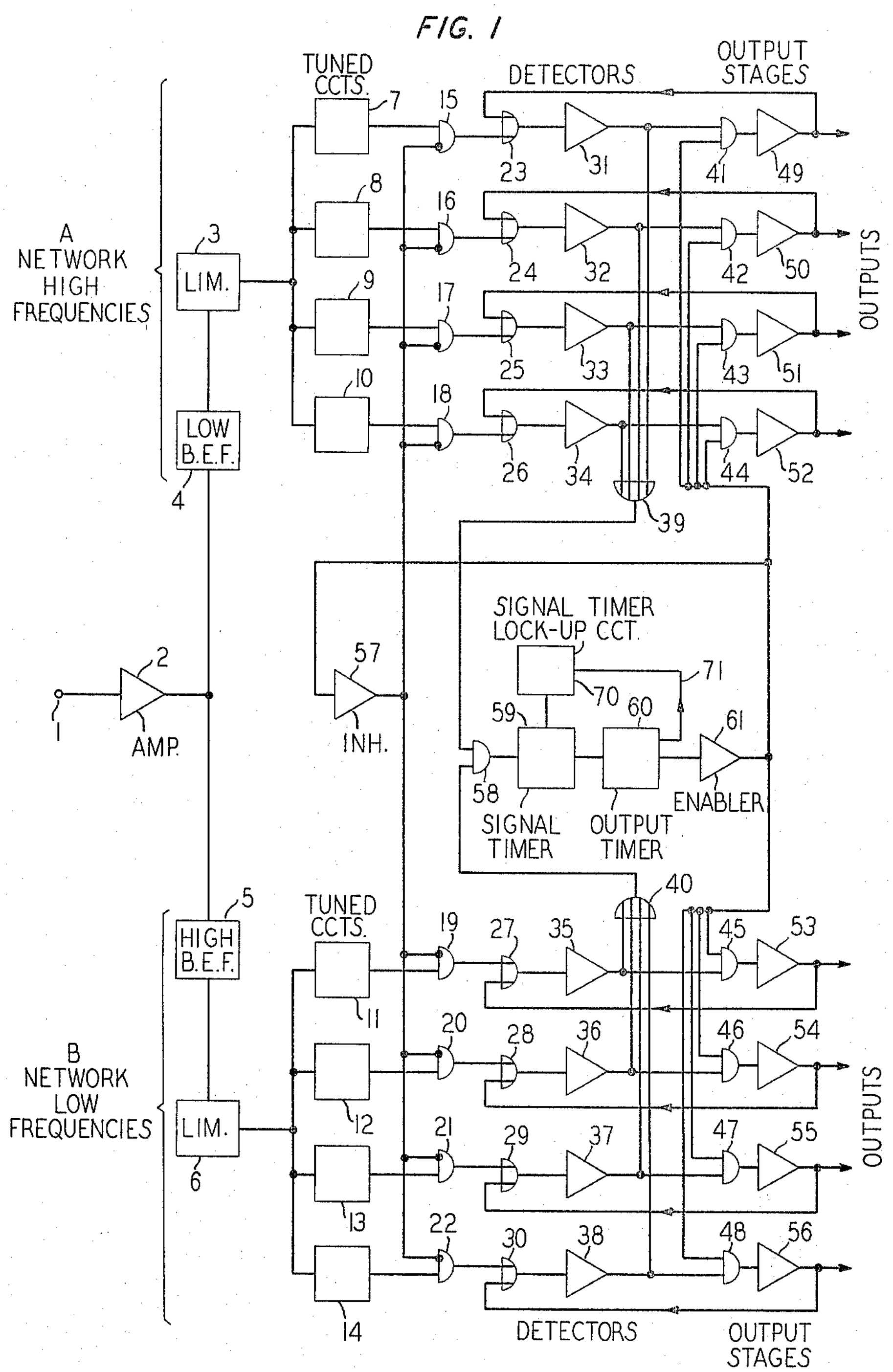
FIG. 1 is a block diagram of a multifrequency signal receiver in accordance with the invention.

The receiver shown in FIG. 1 includes an input or buffer amplifier 2 whose output is applied to each of two band elimination filters 4 and 5. Filter 4 eliminates the relatively low or B-band of frequencies and filter 5 eliminates the relatively high or A-band of frequencies. Outputs from filters 4 and 5 must be of sufficient magnitude to overcome the threshold level of limiters 3 and 6, respectively. The function of limiters 3 and 6 is to convert the tone burst input signals into a symmetrical square wave output at the tone frequency. The selective or tuned circuits 7 through 10 in the A-band and 11 through 14 in the B-band are series tuned circuits and each is resonant at a corresponding one of the input tone frequencies.

In the A-network, each of the tuned circuits 7 through 10 is followed by a respective one of the logic gates 15 through 18. Corresponding units in the B-network are gates 19 through 22. In the absence of an inhibiting signal from inhibitor 57, each of the gates 15 through 22 may pass a signal from its corresponding tuned circuit to a respective one of the detectors 31 through 38 by way of a respective one of the OR gates 23 through 30. Accordingly, in logic circuitry parlance, each of the gates 15 through 22 performs an AND-NOT function. Each of the channels in the two networks additionally includes a respective one of the OR gates 39 and 40, and a respective one of the output stages, each comprising one of the AND gates 41 through 48 and one of the amplifiers 49 through 56. The remainder of the receiver comprises units which are common to both the A and B networks, namely, AND gate 58, signal timer 59, signal timer lock-up circuit 70, output timer 60, enabling circuit 61, and inhibit amplifier 57. The specific function and operation of the receiver together with the cooperative relation among the various circuit combinations may best be described by tracing the path of an illustrative signal.

Assume first that an input signal comprising two tones is applied to input point 1. Each of the two tones is amplified by common input amplifier 2. The high frequency tone is blocked by band elimination filter 5 and the low frequency tone is blocked by band elimination filter 4. The limiter 3 converts the high frequency or A-tone to a square wave of like frequency and a similar function is performed by limiter 6 on the B-tone. The outputs from the limiters each result in an output from a respective pair of the tuned circuits 7 through 14, each circuit of the pair being resonant at a respective one of the input tone frequencies. For example, tuned circuits 7 and 11 may produce outputs and each output is in turn passed by a respective one of the AND-NOT gates 15 and 19 and by a respective one of the OR gates 23 and 27 as an input to a respective one of the detectors 31 and 35.

The detectors are appropriately biased to create a threshold or level which must be overcome by an input signal before such a signal can be conditionally considered as valid. Having met the threshold test of the detectors 31 and 35, the two signals are applied by way of a respective one of the OR gates 39 and 40 to AND gate 58. Coincidence of the signals is required at this point before a signal can be applied to signal timer 59. In turn, signal timer 59 initiates operation of output timer 60 only in the event that the coincidence between the two signals persists for a preselected period such as 30 milliseconds, for example.

If the coincidence duration test imposed by signal timer 59 is satisfied, all required tests have been passed, the input signals are accepted as valid, and the output phase of the receiver operation is initiated.

In response to an output from signal timer 59, output timer 60 generates a timed pulse with a duration which fixes the duration of the final output signal. The problem at this point in the operation is to apply a signal from output timer 60 to one of the output gates 41 through 44 and to one of the output gates 45 through 48, for an output signal is desired from only those output gates whose corresponding detectors have been operated. During the time that the coincidence duration test is made by signal timer 59, information as to the identity of the frequencies of the incoming signal tones is available in the tuned circuits. It cannot be presumed, however, that the information in the tuned circuits will necessarily remain stored for any appreciable time after the termination of the input signals. Consequently, if the input signals terminate before the signal from output timer 60 can be applied to the proper pair of output gates 41 through 48, there is no way, at that point in time, to determine which particular pair of output gates should be employed.

The problem outlined immediately above is met by applying the output signal from output timer 60 to an enabler circuit 61. Enabler 61, in turn, enables each of the AND gates 41 through 48 and keeps them in the enabled condition for the duration of the signal from output timer 60. In one specific embodiment of the invention output timer 60 was designed to generate an output signal having a duration of approximately 45 milliseconds.

Although each of the AND gates 41 through 48 is enabled, only those two gates whose detectors are ON can register outputs. Consequently, in the example being described, AND gates 41 and 45 operate, thereby effecting the operation of output amplifiers 49 and 53, respectively. To ensure the operation of output stages 49 and 53 for the full duration of the signal from output timer 60, irrespective of the termination of oscillations in tuned circuits 7 and 11, a portion of the output signal is fed back to the input of the corresponding detector. Accordingly, in the present illustration, a feedback signal in the A-network is applied to the input of a detector such as 31 by way of an OR gate such as 23. Similarly, in the B-network a feedback signal is applied to a detector such as 35 by way of an OR gate such as 27. As a result, two output gates suchas 41 and 45 remain in the ON condition for the full duration of the signal from output timer 60.

From the block diagram of a receiver in accordance with the invention as shown in FIG. 1, it would appear that a two-tone input signal with a steady duration which exceeds the duration measured by output timer 60 could cause a second output from one of the output amplifiers 49 through 56 at the expiration of the enablement period. Such action is prevented, however, by circuitry which prevents resetting signal timer 59, and hence output timer 60, until one of the detectors 31 through 38 has been reset. Specific circuitry for controlling the operation of signal timer 59 in the manner indicated is shown in the Boesch-Nash-Schenker application, cited above.

An additional feature is employed to increase the protection against false operation of the receiver by spurious signals. As pointed out above, all eight of the AND gates 41 through 48 are enabled during the enablement period. In the event that incoming signal tones are very brief, however, just sufficient for recognition, for example, it is possible that the tones may be followed by spurious signals comprising speech or noise having frequency components which correspond to the resonant frequency of one or more of the tuned circuits 7 through 14. This possibility raises an attendant danger that one or more of the tuned circuits may respond to a spurious signal and produce an output at one or more output stages in addition to the pair which has been activated by the bona fide signal. Such a sequence of operations is prevented by inhibiting the transmission of information from tuned circuits 7 through 14 to the detectors 31 through 38 during the enablement period. More specifically, a part of the output from enabler 61 is fed back through inhibit amplifier 57 and applied to each of the AND-NOT gates 15 through 22. So long as this condition persists, a detector such as 31 or 35 is in effect isolated from the direct application of incoming signals and may be kept operated only by means of feedback from its corresponding output amplifier.

With the circuit described thus far, no protection is provided against the double registration of a single digit which may occur if an input signal of relatively long duration is briefly interrupted by a relativley short break-up occurring after the termination of the signal from output timer 60. More specifically, after a valid signal has been checked and timed and the outputs activated by output timer 60, the detectors are no longer isolated from their respective tuned circuits but instead are under the direct control of the input tones. If the tones break up at this point, owing to the presence of noise for example, the detectors release and the validity check is not satisfied. This action results in the resetting of signal timer 59. When the noise burst ends, and the detectors reoperate, the validity check is again satisfied and hence signal timer 59 and output timer 60 will recycle. Such recycling would result in a second set of outputs from the receiver in response to the receipt of an input signal representing only a single digit.

It has been discovered, however, that most break-ups in the output of the receiver are the result of relatively short duration noise pulses which cause the detectors to release for a period which is generally less than 20 milliseconds. In accordance with the invention, a signal timer lock-up circuit 70 is provided to lock up signal timer 59 for a period of time somewhat in excess of 20 milliseconds after the release of the detectors. Signal timer lock-up circuit 70 prevents signal timer 59 from being reset in response to the receipt of short-duration noise or break-ups as described above. It is not desirable to introduce a delay in the release of signal timer 59, however, until several milliseconds after the completion of the interval timed by output timer 60 in order to avoid affecting the receiver cycle time and speed requirements. Moreover, during the output timer interval, the detectors are immune to noise at the input of the receiver as previously described. In accordance with the invention, therefore, lock-up circuit 70 is energized by way of a feedback path 71 from the output of output timer 60 only after the completion of the output timer interval. Consequently, this aspect of the invention has no effect on normal or fast pulsed receiver operation.

Figure 2:
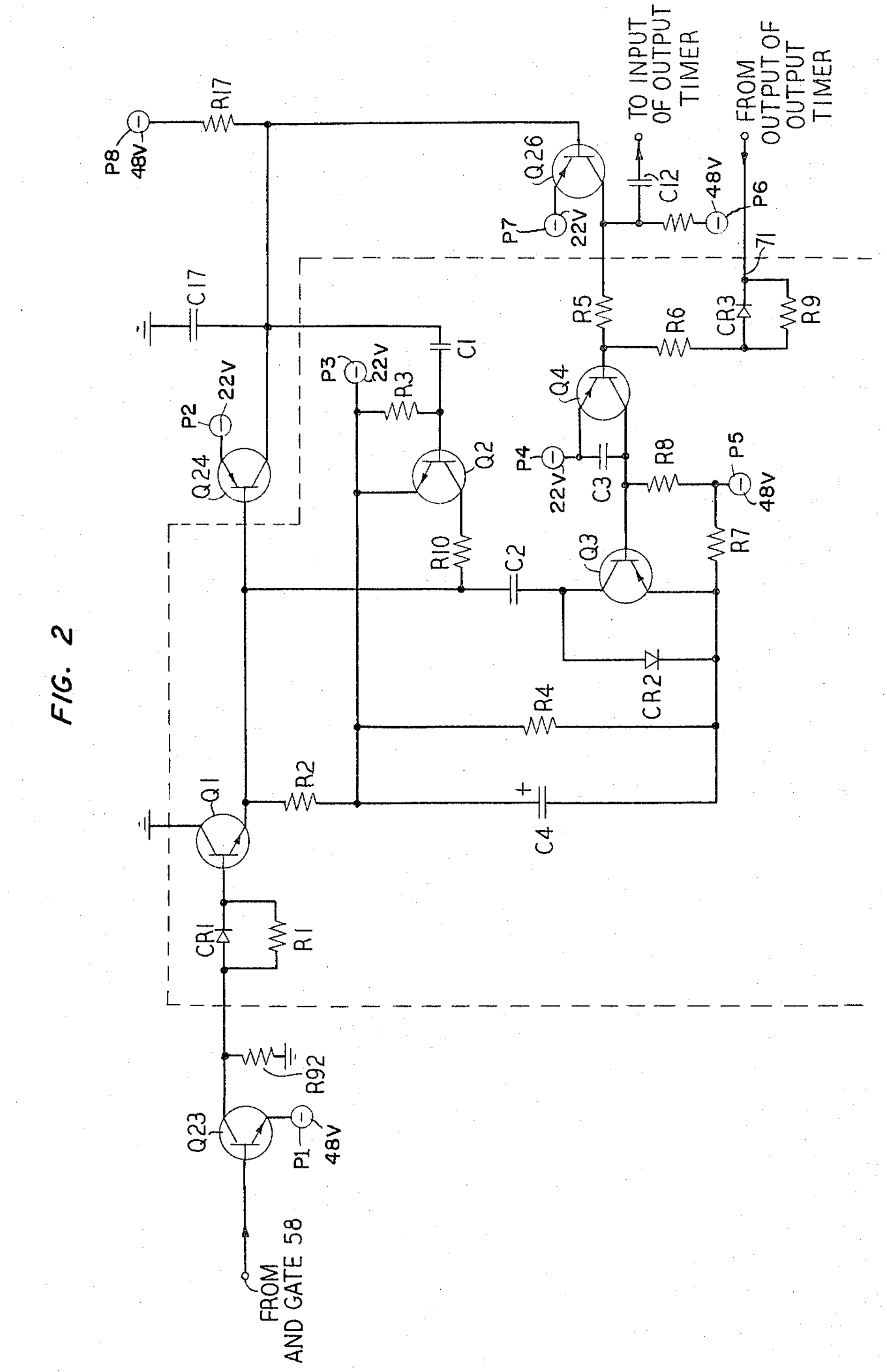
FIG. 2 is a schematic circuit diagram of the signal timer and signal timer lock-up circuit shown in block form in FIG. 1.

A combination schematic circuit diagram of a signal timer 59 and lock-up circuit 70 is shown in FIG. 2. Detailed circuit diagrams of other units shown in block form in FIG. 1 may be of conventional form as shown, for example, in the Boesch-Nash-Schenker application cited above. With reference now to FIG. 2, transistors Q23, Q24, Q26 and their associated circuit elements may be characterized broadly as a signal timer of the same general type shown in the Boesch-Nash-Schenker application. The circuit comprising transistors Q1, Q2, Q3, and Q4 and associated circuit elements included within the dotted line box have in effect been inserted in the path connecting the collector of transistor Q23 to the base of transistor Q24. It is this portion of the circuit which provides the signal timer lock-up function and the fast reset function. Illustrative potential levels for each of the power supplies P1 through P8 are as indicated in FIG. 2.

Transistors Q23 and Q24 are normally ON and in the presence of a valid signal from the detectors are turned OFF, thus permitting capacitor C17 to charge through resistor R17 which provides the necessary signal timing period before turning transistor Q26 ON. Neglecting the circuitry involving transistor Q2 and capacitor C2, it is evident that when transistor Q23 is ON transistor Q1 turns OFF and hence transistor Q24 turns ON. The reverse condition obtains when transistor Q23 is OFF. In any event, so long as transistor Q1 is nonconducting, which in effect isolates capacitor C2, the signal-timing circuit proper operates in conventional fashion. In accordance with the invention, it is when capacitor C2 is actively connected to the emitter of transistor Q1 and its associated circuit that a means is provided for introducing holding time into the operation of signal timer 59.

With reference again to the condition of the circuit during the signal OFF condition, transistor Q1 is OFF, thus holding transistor Q24 ON. When a valid signal appears, transistor Q1 turns ON, thus rapidly charging capacitor C2 through diode CR2. In the event that the input signal disappears immediately, the collector potential of transistor Q1 again drops and transistor Q24 again turns OFF. However, should the input signal persist for a sufficient period of time for transistor Q3 to reach its ON condition, then, if transistor Q1 should turn OFF, owing to the termination of the input signal or to a momentary interruption or break-up its emitter potential cannot fall rapidly but must fall within the time constant determined by resistor R2 and capacitor C2. The circuit is designed, in accordance with the invention, to permit the emitter potential of transistor Q1 to reach the turn-on voltage of transistor Q24, under the conditions described, within a preselected period which may be on the order of 22 milliseconds, for example. Hence any short-duration turn-off of transistor Q1 resulting from a break-up of the input signal is prevented from being passed on through the circuit.

In accordance with the invention, circuitry is also provided to control percisely the turn-on time of transistor Q3. Considering first the conditions at the base of transistor Q4 as explained previously in the discussion of the normal state of the receiver, the collector of transistor Q26 is normally at a reference voltage which may be −48 volts for example. This combination of voltage results in holding transistor Q4 ON and hence transistor Q3 OFF. At the conclusion of the signal timing period, transistor Q26 turns ON, changing its collector voltage from the reference voltage, which in this instance has been assumed to be −48 volts, to −22 volts. This voltage change is applied by way of capacitor C12 to trigger output timer 60 into operation. Output timer 60 may comprise a conventional two-transistor multivibrator of the type shown in the Boesch-Nash-Schenker application. At this point, transistor Q4 remains in the ON condition.

At the conclusion of the output timing interval, a potential drop occurs at the output of output timer 60 which drop is applied to the base of transistor Q4 by way of a path that includes lead 71, diode CR3 and resistor R6, turning transistor Q4 OFF. As a result, the collector potential of transistor Q4 drops toward the reference potential of −48 volts with a time constant determined by resistor R8 and capacitor C3.

The combination of resistors R4 and R7 biases the emitter of transistor Q3 at a level of about −30 volts. Consequently, the collector potential of transistor Q4 must drop to at least that level in order to turn transistor Q3 ON. This action is designed to occupy a preselected period of time, which may be on the order of 4½ milliseconds for example, after the completion of the output timing interval.

With the turn-on of transistor Q3, the lock-up of the signal timer, caused by capacitor C2, is initiated. The delay which, in accordance with the invention, is applied to the lock-up circuit after the conclusion of the output timing interval, is introduced because of the release time which is associated with the receiver detectors. This release time is typically on the order of 3 to 4 milliseconds.

It is evident from the foregoing description that whenever an input signal persists after the output timer turns OFF, the lock-up circuit is activated and consequently the probability of introducing break-ups into the final output signal as a result of noise at the receiver input is virtually eliminated. In the event that the receiver input signal fails to last as long as the output timing interval, however, the lock-up circuit described can have no effect whatsoever upon receiver operation and hence no change is introduced in receiver operate or cycle times.

The feature of the invention which provides protection against possible errors resulting from partial resetting of the signal timer by input signal echoes which last to the exact end of the output timing interval is provided for in the illustrative embodiment shown in FIG. 2 by transistor Q2 and its associated components. At the time when an echo of the type described appears, the lock-up circuit is not yet activated and hence it is possible for the signal timer to be reset. Inasmuch as echoes generally result in extremely short break-ups of the digit outputs, it is possible, owing to the relatively long reset time of the signal timer, partially to reset the timer and hence recycle the receiver. Transistor Q2 is provided, in accordance with the invention, to improve the reset time of the signal timer. More specifically, transistor Q2 and its associated components act as a regenerative circuit to accelerate the turning ON of transistor Q24. When transistor Q24 starts to turn ON, its collector potential rises, resulting in a current through capacitor C1 which drives transistor Q2 ON. This action results in increased base drive through resistor R10, permitting transistor Q24 to conduct a higher current which condition in turn permits a much more rapid discharge of capacitor C17. The increased speed of reset of the signal timer, provided in accordance with the invention as described, provides a substantial reduction in the probability of receiver error of the type caused by partial reset through signal echoes.

Figure 3:
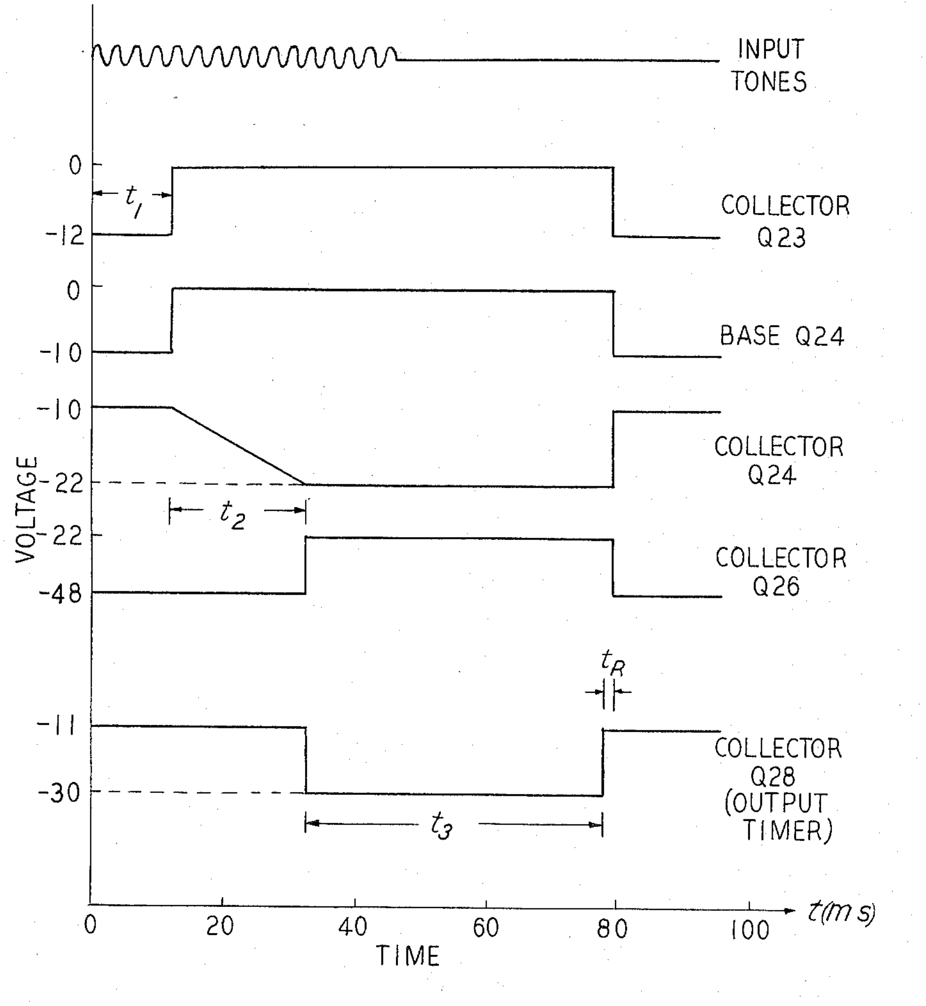
FIG. 3 is a set of voltage waveforms occurring at key points in the circuit shown in FIG. 2 during normal or short signal operation.
Figure 4:
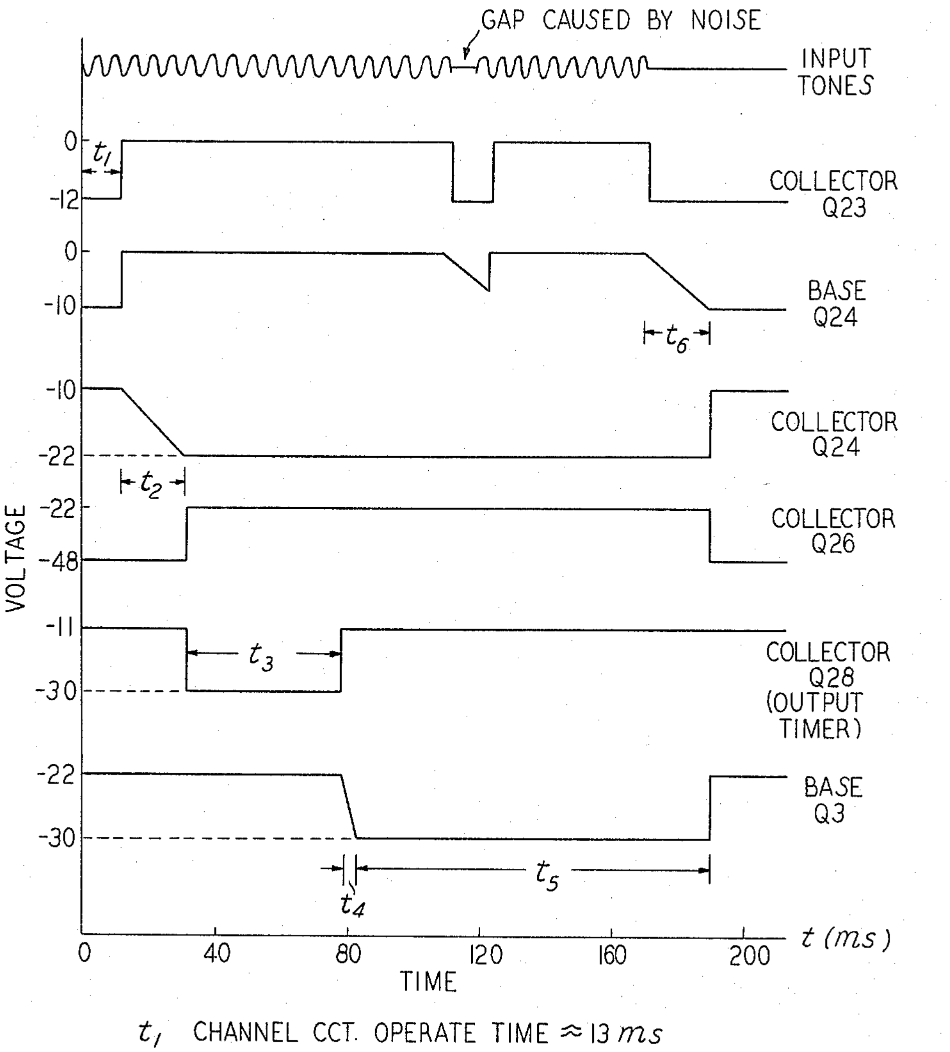
FIG. 4 is a set of voltage waveforms occurring at key points in the circuit shown in FIG. 3 during long signal operation.

Further clarification of the operation of the circuitry shown in FIG. 2 is provided by the illustrative waveforms shown in FIGS. 3 and 4. In FIG. 3, the waveforms illustrate so-called "normal receiver operation," since the input tones terminate before the end of timing period $T_3$. Breaks in the input tones which might occur during the period $T_3$ would, of course, have no effect on the operation of output timer 60 or upon the final output signal.

In FIG. 4 it may be observed that the duration of the input tones extends well beyond the duration of output timer 60 and further that a brief gap of the type that might be caused by noise occurs at approximately 115 milliseconds. It should further be noted, however, that the noise gap has no effect on the waveform at the collector of transistor Q24 or at the collector of transistor Q26 and accordingly the operation of output timer 60 remains unaffected.

It is to be understood that the embodiment described herein is merely illustrative of the principles of the invention. Various modifications may be made by persons skilled in the art without departing from the spirit and scope of the invention.

What is claimed is:

1. In a multifrequency signal receiver having an input point and a plurality of output points, in combination, means responsive to the application of a pair of coincident oscillatory input signals to said input point for generating a first signal, the frequency combination of said input signals being indicative of a corresponding intelligence character, means responsive to one of said first signals exceeding a first preselected duration for generating a second signal, means responsive to said second signal for generating a third signal of a second preselected duration, means responsive to said third signal for generating a final pair of direct current output signals each applied to a respective one of said output points, the combination of said last named output points being indicative of said intelligence character, means responsive to said third signal for inhibiting the operation of said first means for the duration of said third signal, means jointly responsive to the termination of said third signal and to the persistence of said pair of input signals beyond said last named termination for rendering said second signal generating means insensitive to relatively short duration break-ups in said first signal occurring after the termination of said third signal, thereby precluding the recycling of said last named means and said third signal generating means in response to said break-ups, whereby protection is provided against the possible generation of more than a single pair of said output signals in response to a single pair of said input signals.

2. Apparatus in accordance with claim 1 wherein said jointly responsive means comprises means for introducing a time delay of predetermined duration into the operation of said second signal generating means, whereby break-ups in said input signals persisting for any period of time less than said predetermined duration have no effect on the generation of said second signal.

3. Apparatus in accordance with claim 1 wherein said second signal generating means includes first and second transistors, each including a respective base, emitter and collector electrode, means for applying said first signal to the base of said first transistor thereby to switch said first transistor to a nonconducting state, means connecting the collector of said first transistor to the base of said second transistor whereby said second transistor is switched to the nonconducting state in response to the switching of said first transistor to said nonconducting state, means responsive to the switching of said second transistor to said nonconducting state for exponentially shifting the potential on the collector of said second transistor to a preselected level, said level being attained upon the termination of said first preselected duration, and means responsive to a potential of said preselected level on the collector of said second transistor for applying said second signal to said third signal generating means.

4. Apparatus in accordance with claim 3 wherein said connecting means comprises a third transistor having base, emitter and collector electrodes, said last named base electrode being connected to the collector of said first transistor and said last named emitter electrode being connected to the base of said second transistor, and means responsive to the termination of said third signal for controlling the rate of potential change on the emitter of said second transistor.

5. Apparatus in accordance with claim 4 including transistor switching means operatively responsive to the termination of said third signal for connecting the emitter of said third transistor to said controlling means.

6. Signal translating means for generating a single output signal of a first preselected duration in response to an input signal of at least a second preselected duration comprising, in combination, first circuit means having an input point and an intermediate output point responsive to the application of said input signal to said input point, said input signal having at least said second preselected duration, for applying a potential change of preselected magnitude to said intermediate output point, means responsive to said potential change at said intermediate output point for generating said output signal and applying said output signal to a first output point, means jointly responsive to the termination of said output signal and to the persistence of said input signal beyond said termination for maintaining the potential of said intermediate output point at a fixed level irrespective of interruptions in said input signal so long as the duration of said interruption does not exceed a preselected period, thereby ensuring the generation of only a single output signal in response to said input signal irrespective of interruptions in said input signal occurring after the termination of said output signal.

7. Apparatus in accordance with claim 6 including means responsive to the inception of said output signal for isolating said input point from said input signal for the duration of said output signal, whereby said output signal is unaffected by interruptions in said input signal occurring at any time during the generation of said output signal.

8. Apparatus in accordance with claim 7 including means for interposing a delay in the operation of said jointly responsive means, said delay being at least equal to the time interval between the termination of said output signal and the termination of the operation of said isolating means.

9. In a multifrequency signal receiver having an input point and a plurality of output points in combination, means responsive to the application of a pair of coincident A.C. signals to said input point for generating a first signal, each of said A.C. signals having a unique frequency, the combination of the frequencies of said A.C. signals being indicative of an intelligence character in accordance with a first preselected code, a first intermediate input point, means for applying said first signal to said first intermediate input point, first circuit means including said first intermediate input point and a first intermediate output point responsive to the application of said first signal, having at least a first preselected duration, to said first intermediate input point for applying a potential change of preselected magnitude to said first intermediate output point, means including a second intermediate output point responsive to said potential change at said first intermediate output point for generating a timing signal having a second preselected duration and for applying said timing signal to said second intermediate output point, means jointly responsive to the termination of said timing signal and to the persistence of said input signal beyond said termination for maintaining the potential of said first intermediate output point at a fixed level irrespective of interruptions in said input signals so long as the duration of said interruptions does not exceed a preselected period, thereby ensuring the generation of only a single timing signal in response to a single first signal, and means responsive to said timing signal for applying a D.C. signal to each of a pair of said output points, the particular combination of said output points being indicative of said intelligence character in accordance with a second preselected code.

10. Apparatus in accordance with claim 9 wherein said first circuit means comprises first, second and third transistors each including a respective base, emitter, and collector electrode, means connecting the collector of said first transistor to the base of said second transistor, means connecting the collector of said second transistor to the base of said third transistor, means connecting the collector of said third transistor to said first intermediate output point, means controlling the rate of potential change on the collector of said second transistor in exponential fashion whereby a potential change applied to the base of said second transistor is required to persist for at least said preselected duration before any potential change may occur at said first intermediate output point.

11. Apparatus in accordance with claim 9 including means responsive to the inception of said timing signal for isolating said first intermediate input point from said first signal whereby the duration and form of said timing signal is immune to variations in said first signal during said second preselected duration.

12. Apparatus in accordance with claim 10 wherein said connecting means includes a fourth transistor having a base, an emitter and a collector electrode, said fourth transistor also being a part of said jointly responsive means, said connecting means further including means connecting the collector of said first transistor to the base of said fourth transistor and means connecting the emitter of said fourth transistor to the base of said third transistor, said jointly responsive means further including means for controlling the rate of any potential change on the emitter of said fourth transistor in exponential fashion.

13. Apparatus in accordance with claim 10 wherein said connecting means includes a fourth transistor having a base, an emitter and a collector electrode, said fourth transistor also being a part of said jointly responsive means, said connecting means further including means connecting the collector of said first transistor to the base of said fourth transistor and means connecting the emitter of said fourth transistor to the base of said third transistor, said jointly responsive means further including a timing circuit for controlling the rate of any potential change on the emitter of said fourth transistor and means including a fifth transistor responsive to the termination of said timing signal for connecting said last named timing circuit to the emitter of said fourth transistor.

14. Apparatus in accordance with claim 10 including a regenerative circuit connecting the collector and base electrodes of said third transistor thereby to control the rate of change between the conducting and nonconducting states of said third transistor.

No references cited.

NEIL C. READ, *Primary Examiner.*

P. XIARHOS, *Assistant Examiner.*